US009634963B2

(12) United States Patent
Zhang (10) Patent No.: US 9,634,963 B2
(45) Date of Patent: Apr. 25, 2017

(54) METHOD AND SYSTEM FOR HANDLING MESSAGE ON INSTANT MESSAGING OPEN PLATFORM (71) Applicant: TENCENT TECHNOLOGY (SHENZHEN) COMPANY LIMITED, Shenzhen (CN)

(72) Inventor: Xiaolong Zhang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 610 days.

(21) Appl. No.: 14/082,300

(22) Filed: Nov. 18, 2013

(65) Prior Publication Data
US 2014/0310361 A1 Oct. 16, 2014

Related U.S. Application Data (63) Continuation of application No. PCT/CN2013/075071, filed on May 2, 2013.

(30) Foreign Application Priority Data

Apr. 16, 2013 (CN) .......................... 2013 1 0132933

(51) Int. Cl.
H04N 7/16 (2011.01)
G06F 15/16 (2006.01)
H04L 12/58 (2006.01)

(52) U.S. Cl.
CPC .................... H04L 51/04 (2013.01)

(58) Field of Classification Search
USPC ................................ 709/296, 219
See application file for complete search history.

(56) References Cited

U.S. PATENT DOCUMENTS 8,594,105 B1 * 11/2013 Breau ................. H04W 8/04
370/329
9,185,060 B1 * 11/2015 Malik ................. H04L 51/04
(Continued)

FOREIGN PATENT DOCUMENTS

CN 1744582 A 3/2006
CN 102075543 A 5/2011
(Continued)

OTHER PUBLICATIONS

Taiwan Intellectual Property Office (TIPO) Office Action 1 for 102140541 Mar. 13, 2015.
(Continued)

Primary Examiner — Jude Jean Gilles
(74) Attorney, Agent, or Firm — Anova Law Group, PLLC (57) ABSTRACT Various embodiments provide a method and system for handling a message on an instant messaging (IM) open platform. In an exemplary method, a message sent to a network application can be received. The network application can be an application plugged in the IM open platform. The received message can be pushed to an access address of the network application. A reply message returned by the network application based on the message can be received and forwarded. An exemplary system for handling a message on an instant messaging (IM) open platform can include a receiving module, a pushing module, and/or a reply processing module.

18 Claims, 6 Drawing Sheets

(56) References Cited

U.S. PATENT DOCUMENTS

| | | | |
|---|---|---|---|
| 2005/0048961 A1* | 3/2005 | Ribaudo | H04M 3/42348 455/419 |
| 2007/0030824 A1* | 2/2007 | Ribaudo | G01S 5/0018 370/328 |
| 2007/0174400 A1* | 7/2007 | Cai | H04L 12/14 709/206 |
| 2007/0254636 A1* | 11/2007 | Jiang | H04M 3/42 455/414.1 |
| 2007/0281669 A1* | 12/2007 | Jiang | H04M 3/44 455/414.1 |
| 2008/0267217 A1* | 10/2008 | Colville | H04L 47/10 370/477 |
| 2009/0064218 A1* | 3/2009 | Yamagishi | H04N 21/41407 725/25 |
| 2010/0250680 A1* | 9/2010 | Bhatt | H04L 12/5895 709/206 |
| 2010/0318618 A1* | 12/2010 | Parker | G06F 17/30893 709/206 |
| 2013/0054706 A1* | 2/2013 | Graham | H04M 19/04 709/206 |
| 2013/0231107 A1* | 9/2013 | Mannepally | H04W 8/06 455/432.3 |

FOREIGN PATENT DOCUMENTS

| | | |
|---|---|---|
| CN | 102238007 A | 11/2011 |
| CN | 102394887 A | 3/2012 |
| CN | 102739708 A | 10/2012 |
| CN | 102811178 A | 12/2012 |
| CN | 103001860 A | 3/2013 |
| EP | 1345397 B1 | 6/2006 |

OTHER PUBLICATIONS

The World Intellectual Property Organization (WIPO) International Search Report for PCT/CN2013/075071 Jan. 23, 2014.
The State Intellectual Property Office of the People's Republic of China (SIPO) Office Action 1 for 201310132933.1 Apr. 14, 2015.

* cited by examiner

METHOD AND SYSTEM FOR HANDLING MESSAGE ON INSTANT MESSAGING OPEN PLATFORM

CROSS-REFERENCES TO RELATED APPLICATIONS

This application is a continuation of PCT Patent Application No. PCT/CN2013/075071, filed on May 2, 2013, which claims priority to Chinese Patent Application No. CN201310132933.1, filed on Apr. 16, 2013, the entire contents of all of which are incorporated herein by reference.

FIELD OF THE DISCLOSURE

The present disclosure relates to Internet application technology and, more particularly, relates to a method and system for handling a message on an instant messaging (IM) open platform.

BACKGROUND

With development of an open platform of an Internet application, the open platform is used as a carrier to provide users with various network applications. Specifically, a network application running on an open platform may be a third-party application provided by a third-party developer. The third-party developer provides users with the third-party application via the open platform to provide users with various services and messages, for example, to push various messages to users.

In a conventional open platform, most of the network applications, such as third-party applications, push messages to users via the open platform to realize message circulation. However, since the third-party applications can freely push messages to users, the open platform cannot control the message pushing performed by the third-party applications. This may cause overflow of various messages, lead to a waste of the open platform and network resources, and also cause harassments to the users.

BRIEF SUMMARY OF THE DISCLOSURE

According to various embodiments, there is provided a method for handling a message on an instant messaging (IM) open platform. In this method, a message sent to a network application can be received. The network application can be an application plugged in the IM open platform. The received message can be pushed to an access address of the network application. A reply message returned by the network application based on the message can be received and forwarded.

According to various embodiments, there is also provided a system for handling a message on an instant messaging (IM) open platform. The system can include a receiving module, a pushing module, and a reply processing module. The receiving module can be configured to receive a message sent to a network application. The network application can be an application plugged in the IM open platform. The pushing module can be configured to push the received message to an access address of the network application. The reply processing module can be configured to receive and forward a reply message returned by the network application based on the message.

As disclosed, after a message sent by a user to a network application is received, the message can be pushed to an access address of the network application. Based on the pushed message, the network application can return a reply message to the IM open platform to have the IM open platform forward the reply message. In this manner, only after the message (e.g., sent by the user) is received, the message generated by the network application can circulate via the IM open platform. This can effectively prevent network applications from freely pushing messages, and thus can reduce operation burden of the IM open platform, save network resources, and avoid causing harassment to users.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

Methods and systems for handling a message on an instant messaging (IM) open platform are provided herein. In an exemplary method, a message sent to a network application can be received. The network application can be an application plugged in the IM open platform. The received message can be pushed to an access address of the network application. A reply message returned by the network application based on the message can be received and forwarded. An exemplary system for handling a message on an instant messaging (IM) open platform can include at least a receiving module, a pushing module, and a reply processing module.

As disclosed, after a message sent by a user to a network application is received, the message can be pushed to an access address of the network application. Based on the pushed message, the network application can return a reply message to the IM open platform to have the IM open platform forward the reply message. In this manner, only after the message (e.g., sent by the user) is received, a message generated by the network application can circulate via the IM open platform. This can effectively prevent network applications from freely pushing messages, and thus can reduce operation burden of the IM open platform, save network resources, and avoid causing harassment to users.

Figure 1:
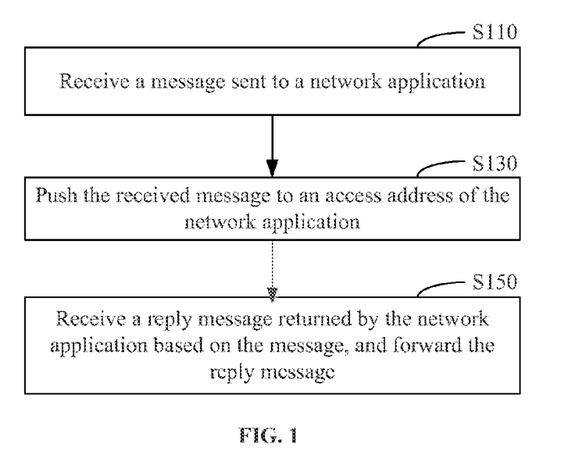
FIG. 1 depicts an exemplary method for handling a message on an instant messaging (IM) open platform in accordance with various embodiments.

FIG. 1 depicts an exemplary method for handling a message on an instant messaging (IM) open platform in accordance with various embodiments.

In Step S110, a message sent to a network application is received. For example, the network application can be an application plugged in an IM open platform. The network application may be a third-party application provided by a third-party developer. The IM open platform can be an open platform built on top of IM tools. Users can use the IM tools to interact with network applications plugged in the IM open platform.

Types of the message sent to the network application can be, for example, a text, an image, a geographical location message, a media message, and the like. For example, a geographical location message can record latitude and longitude of a geographical location that is obtained by using a terminal to position the geographical location. The media message can be a voice message inputted by a user.

An interface corresponding to the IM open platform can be displayed by the IM tools. The interface can include a list of a number of corresponding network applications. In other words, in the IM tools run by a user, the network applications plugged in the IM open platform can be displayed in a form as contact persons (or contacts). A selection operation triggered by the user with respect to a certain network application can be obtained.

Specifically, the network applications plugged in the IM open platform can exist, in the form as contact person information, in a contact person list of the IM tools. By selecting the contact person information in the contact person list, the user can enter a conversation interface with the network application, and input a certain message to send to a back-end server of the IM open platform.

In Step S130, the received message is pushed to an access address of the network application. For example, based on the message, a receiver (i.e., the access address of the network application) of the message can be obtained. Based on the access address, the message sent by a user can be pushed to a corresponding network application to inform the network application about information access needs of the user, such that message propagation performed by the network application can substantially match the user's intention to achieve an effective message circulation; avoid overflow of spam messages; and reduce redundant messages over the Internet.

The access address of the network application can be filled out when configurations of the network application are plugged in the IM open platform. The access address of the network application can correspond to an address of a server resource of the network application.

In Step S150, a reply message returned by the network application based on the message is received and forward. For example, the server resource where the network application resides can receive the message pushed by the IM open platform and can obtain a corresponding reply message based on the message. The reply message can record receiver identification information. The receiver identification information can be sender identification information recorded in the received message. The obtained reply message can be returned to the IM open platform. At this point, based on the sender identification information recorded in the reply message, the IM open platform can forward the reply message.

Further, the server resource for the network application can search, based on the received message, to obtain a relevant reply message. For example, the developer of the network application can pre-construct a corresponding database. After a message is received from a user, a keyword can be extracted from the message. Based on the keyword, a search can be performed in the constructed database to obtain a relevant reply message.

In addition, resources on the Internet can be searched, based on the message of the user, to obtain the relevant reply message. Any suitable processes for obtaining a reply message can be encompassed herein for handling messages on the IM open platform.

In one embodiment, prior to Step S110, the exemplary method of FIG. 1 can further include: obtaining configuration information of the network application via the IM open platform, and plugging the network application in the IM open platform based on the configuration information.

For example, a configuration interface of the IM open platform can be used to obtain configuration information inputted by a network application developer to configure the network application on the IM open platform. The configuration information can include the access address and a token of the network application.

After configuring the network application on the IM open platform is completed, the configuration information of the network application can be obtained via the IM open platform. Based on the token in the configuration information, corresponding verification information and a request for plugging in the IM open platform that contains the verification information can be generated. The request for plugging in the IM open platform can be sent to the network application according to the access address recorded in the configuration information.

After the server resource for the network application receives the request for plugging in sent from the IM open platform, the verification information in the request can be verified to determine whether the request for plugging in is from the IM open platform. When the request for plugging in is determined from the IM open platform, the plugging in between the network application and the IM open platform becomes effective. When, to the contrary, the request for plugging in is determined not from the IM open platform, the network application fails to be plugged in the IM open platform.

Figure 2:
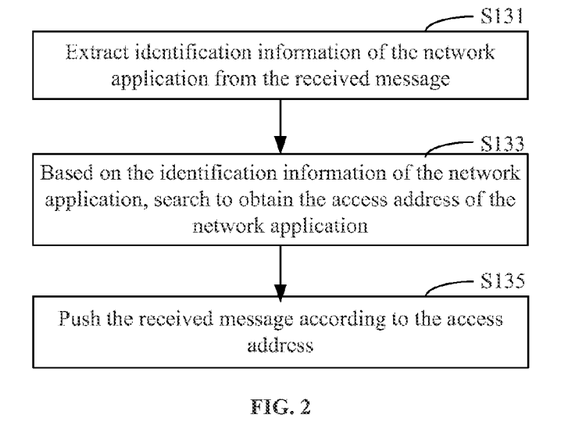
FIG. 2 depicts an exemplary method for pushing a received message in accordance with various disclosed embodiments.

FIG. 2 depicts an exemplary method for pushing a received message to an access address of a network application, as depicted in Step S130 of FIG. 1, in accordance with various disclosed embodiments.

In Step S131, identification information of the network application is extracted from the received message. For example, the message received by the IM open platform can include receiver identification information of the message (i.e., identification information of the network application); sender identification information; and message content and/or a corresponding link.

The sender identification information is an identification of an IM tool corresponding to the user who sends the message. When the message is a text message, the message includes message content. When the message is an image message or a media message, the message records a corresponding link. The link can be a storage address of an image or media document in a back-end server of the IM open platform. There is no need to forward a specific image or media document to the server resource of the network application, and this can save network transmission resources.

In Step S133, based on the identification information of the network application, the access address of the network application can be found. For example, the identification information corresponding to the network application plugged in the IM open platform can be stored associated with the access address of the network application. Therefore, a search based on the identification information of the network application can allow the access address of the network application to be found.

In Step S135, the received message is pushed according to the access address. For example, message pushing can be performed based on the found access address to push the message to the server resource of the corresponding network application.

After the server resource of the network application receives the pushed message and when the message includes a text message, the message content recorded in the message can be directly read and a keyword can be extracted from the message content. A search based on the keyword can allow a reply message to be found, and the reply message can be returned to the IM open platform.

When the message includes an image message and/or a media message, a link recorded in the message can be read. Based on the link, a corresponding image or media document can be obtained. Based on the obtained image or media document, a corresponding reply message can be obtained and sent to the IM open platform.

Figure 3:
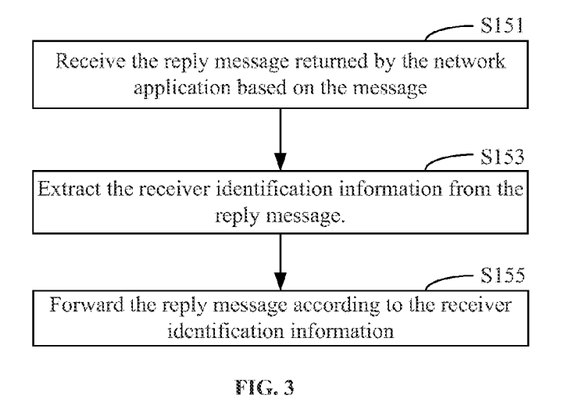
FIG. 3 depicts an exemplary method for receiving and forwarding a reply message in accordance with various disclosed embodiments.

FIG. 3 depicts an exemplary method for receiving and forwarding a reply message, as depicted in Step S150 of FIG. 1, in accordance with various disclosed embodiments.

In Step S151, the reply message returned by the network application based on the message is received. For example, the received reply message is a response from the network application to the message sent by the user.

In Step S153, the receiver identification information is extracted from the reply message. For example, the receiver identification recorded in the reply message can be extracted to identify the user who sends the message to which the currently received reply message is a response.

In Step S155, the reply message according to the receiver identification information is forwarded. The reply message can be sent to the IM tool corresponding to the receiver identification information to allow the user who has previously sent the message to view the corresponding reply message.

Figure 4:
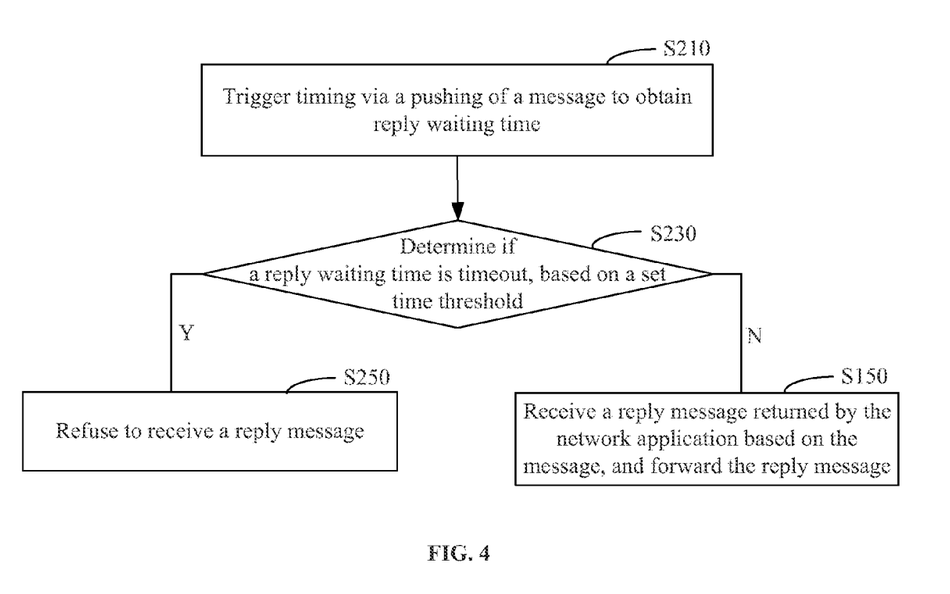
FIG. 4 depicts another exemplary method for handling a message on an IM open platform in accordance with various embodiments.

FIG. 4 depicts further processes/steps following Step S130 of FIG. 1 in accordance with various disclosed embodiments.

In Step S210, timing via a pushing of the message is triggered to obtain a reply waiting time. For example, the pushing of the message can trigger timing to time the waiting time for the IM open platform to receive a response to the message from the network application. On the IM open platform, timing can be performed with respect to every pushed message to obtain a corresponding reply waiting time for every message.

In Step S230, based on a set time threshold, it is determined whether a reply waiting time is timeout. When the reply waiting time is determined to be timeout, the method proceeds to Step S250. Otherwise, when the reply waiting time is determined not to be timeout, the method proceeds to Step S150 in FIG. 1.

For example, when the currently timed reply waiting time is determined to be timeout, that is, the currently timed reply waiting time exceeds a set time threshold, connection of the network application with the server resource can be disconnected to stop receiving the reply message returned from the network application. The timed reply waiting time and the set time threshold can be used to control the response of the network application to user's message to ensure instantaneity of the message and to allow the user to obtain the latest message.

In Step S250, it is refused to receive a reply message.

In one embodiment, the reply message can include a text message. After performing Step S150, the method in FIG. 1 can further include extracting message content from the received reply message and displaying the extracted message content.

After receiving the reply message forwarded by the IM open platform, the IM tool corresponding to the receiver of the reply message can directly extract the message content recorded in the reply message and display the message content in the conversation interface with the network application.

Figure 5:
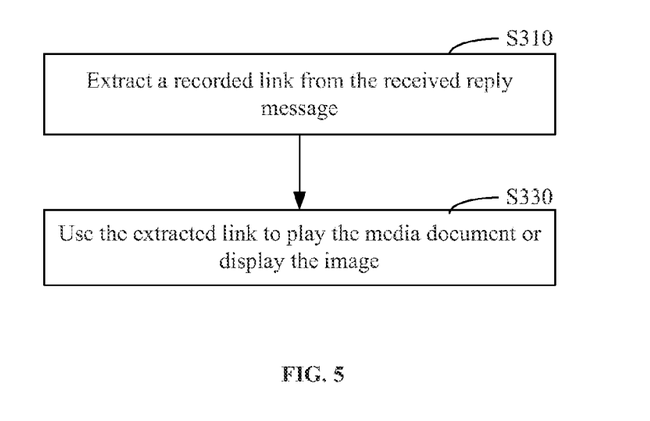
FIG. 5 depicts another exemplary method for handling a message on an IM open platform in accordance with various embodiments.

FIG. 5 depicts another exemplary method including further processes/steps following Step S150 of FIG. 1 in accordance with various disclosed embodiments. In one embodiment, the above-described reply message can include a media message and/or an image message.

In Step S310, a recorded link is extracted from the received reply message. In Step S330, the extracted link is used to play the media document or display the image. For example, the extracted link can be used to download a corresponding media document or image and display the media document or image in a conversation interface with the network application.

Figure 6:
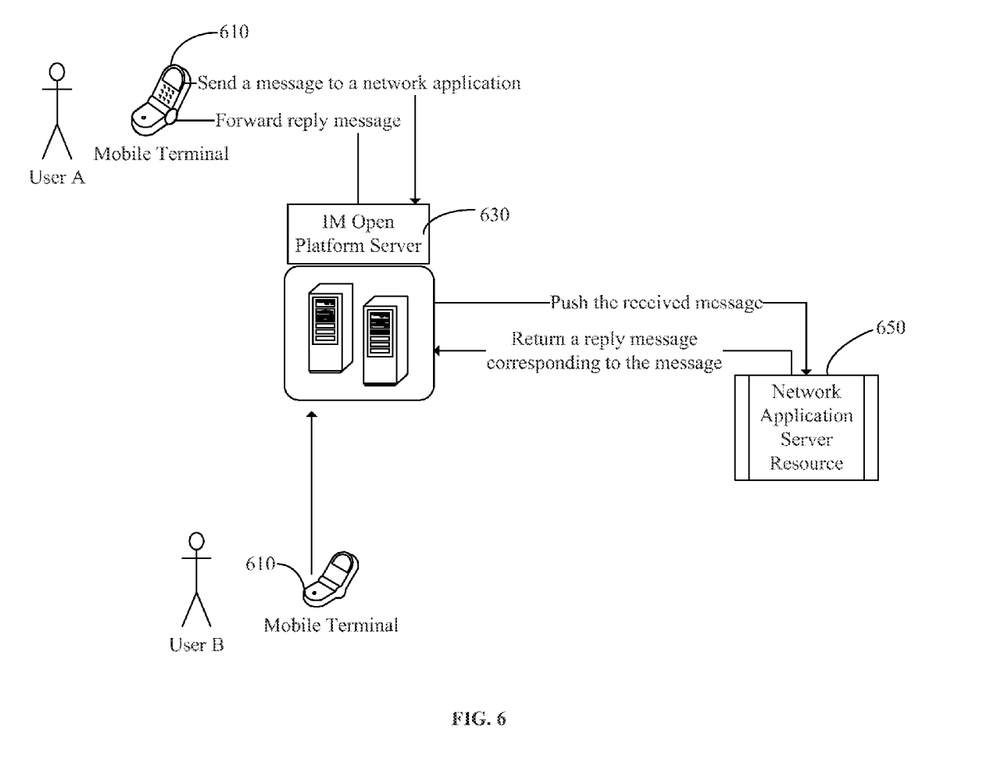
FIG. 6 depicts an exemplary operating environment of a method for handling a message on an IM open platform in accordance with various embodiments.

In various embodiments, the methods for handling a message using an IM open platform can be implemented by a computer program and can be run on an IM open platform server 630 as illustrated in an exemplary system in FIG. 6.

As shown in FIG. 6, the IM open platform server can store program commands and other data corresponding to the methods for handling a message on the IM open platform as depicted in FIGS. 1-5. After receiving a message sent by an IM tool running on an electronic device such as a mobile terminal 610, the server can forward the message to a server resource 650 of a corresponding network application and receive a reply message returned from the server resource 650 of the network application, and send the reply message to the IM tool running on the mobile terminal 610. This can reduce a load on the IM open platform server and can be convenient for a network application developer to connect a network application to the IM open platform.

Figure 7:
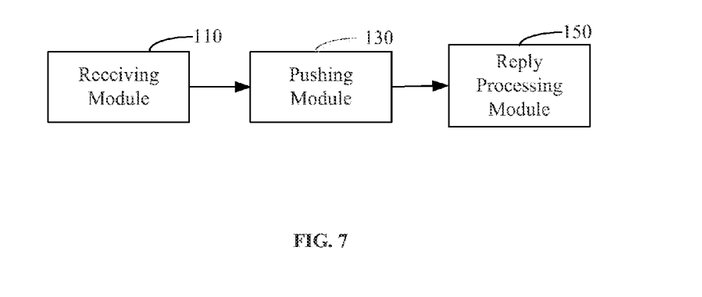
FIG. 7 depicts an exemplary system for handling a message on an IM open platform in accordance with various disclosed embodiments.

FIG. 7 depicts an exemplary system for handling a message on an IM open platform in accordance with various disclosed embodiments. The system can include a receiving module 110, a pushing module 130, and/or a reply processing module 150.

The receiving module 110 can be used to receive a message sent to a network application. For example, the network application can be an application plugged in an IM open platform, which may be a third-party application provided by a third-party developer. The IM open platform can be an open platform based on IM tools. Users can use the IM tools to interact with network applications plugged in the IM open platform.

Types of the message sent to the network application can be, for example, a text, an image, a geographical location message, a media message, and the like. For example, a geographical location message can record latitude and longitude of a geographical location that is obtained by using a terminal to position the geographical location. The media message can be a voice message inputted by a user.

An interface corresponding to the IM open platform can be displayed by the IM tools. The interface can include a list of a number of corresponding network applications. In other words, in the IM tools run by a user, the network applications plugged in the IM open platform can be displayed in the form as contact persons (or contacts). A selection operation triggered by the user with respect to a certain network application can be obtained.

Specifically, the network applications plugged in the IM open platform can exist, in the form as contact person information, in a contact person list of the IM tools. By selecting the contact person information in the contact person list, the user can enter a conversation interface with the network application, and input a certain message to send to a back-end server of the IM open platform.

The pushing module 130 can be used to push the received message to an access address of the network application. In one embodiment, based on the message, the pushing module 130 can obtain a receiver (i.e., the access address of the network application) of the message. Based on the access address, the pushing module 130 can push the message sent by the user to the corresponding network application to inform the network application about information access needs of the user, such that message propagation performed by the network application can substantially match the user's intention to achieve an effective message circulation; avoid overflow of spam messages; and reduce redundant messages over the Internet.

The access address of the network application can be filled out when configurations of the network application are plugged in the IM open platform, and can correspond to an address of a server resource of the network application.

The reply processing module 150 can be used to receive and forward a reply message returned by the network application based on the message.

For example, the server resource of the network application can receive the message pushed by the IM open platform and can obtain a corresponding reply message based on the message. The reply message can record receiver identification information. The receiver identification information can be sender identification information recorded in the received message. The obtained reply message can be returned to the IM open platform. At this point, based on the sender identification information recorded in the reply message, the reply processing module 150 can forward the reply message.

Further, the server resource for the network application can search, based on the received message, to obtain a relevant reply message. For example, the developer of the network application can pre-construct a corresponding database. After a message is received from a user, a keyword can be extracted from the message. Based on the keyword, a search can be performed in the constructed database to obtain a relevant reply message.

In addition, resources on the Internet can be searched, based on the message of the user, to obtain the relevant reply message. Any suitable processes for obtaining a reply message can be encompassed herein for handling a message on the IM open platform.

Figure 8:
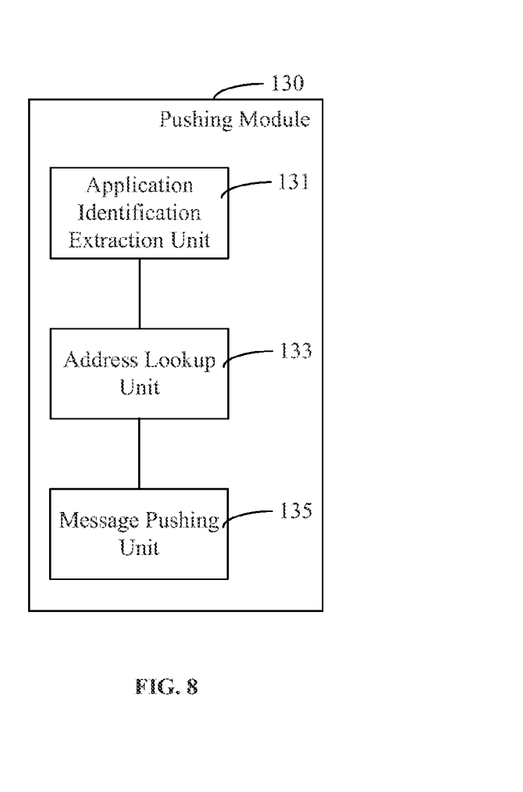
FIG. 8 depicts an exemplary pushing module in accordance with various disclosed embodiments.

FIG. 8 depicts an exemplary pushing module 130 of FIG. 7 in accordance with various disclosed embodiments. The exemplary pushing module 130 can include an application identification extraction unit 131, an address lookup unit 133, and/or a message pushing unit 135.

The application identification extraction unit 131 can be used to extract identification information of the network application from the received message. For example, the message received by the IM open platform can include receiver identification information of the message (i.e., identification information of the network application); sender identification information; and message content and/or a corresponding link.

The sender identification information is an identification of an IM tool corresponding to the user who sends the message. When the message is a text message, the message includes message content. When the message is an image message or a media message, the message records a corresponding link. The link can be a storage address of an image or media document in a back-end server of the IM open platform. There is no need to forward a specific image or media document to the server resource where the network application resides, and this can save network transmission resources.

Based on the identification information of the network application, the address lookup unit 133 can be used to search to obtain the access address of the network application.

For example, the identification information corresponding to the network application plugged in the IM open platform is stored associated with the access address of the network application. Therefore, the address lookup unit 133 can search based on the identification information of the network application to find the access address of the network application.

The message pushing unit 135 can be used push the received message according to the access address. For example, the message pushing unit 135 can perform message pushing based on the found access address to push the message to the server resource of the corresponding network application After the server resource of the network application receives the pushed message and when the message includes a text message, the message content recorded in the message can be directly read and a keyword can be extracted from the message content. A search based on the keyword can allow a reply message to be found, and the reply message can be returned to the IM open platform.

When the message includes image message and/or media message, a link recorded in the message can be read. Based on the link, a corresponding image or media document can be obtained. Based on the obtained image or media document, a corresponding reply message can be obtained and sent to the IM open platform.

Figure 9:
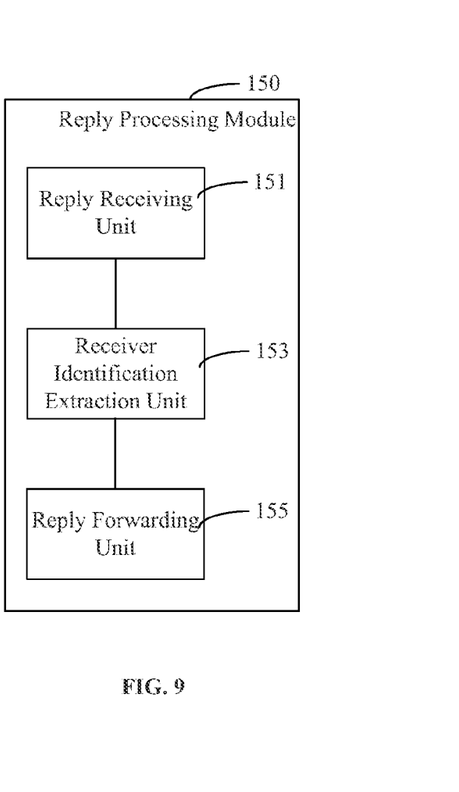
FIG. 9 depicts an exemplary reply processing module in accordance with various disclosed embodiments.

FIG. 9 depicts an exemplary reply processing module 150 of FIG. 7 in accordance with various disclosed embodiments. The exemplary reply processing module 150 can include a reply receiving unit 151, a receiver identification extraction unit 153, and/or a reply forwarding unit 155.

The reply receiving unit 151 can be used to receive the reply message returned by the network application based on the message. For example, the reply message received by the reply receiving unit 151 can be a response from the network application to the message sent by the user.

The receiver identification extraction unit 153 can be used to extract the receiver identification information from the reply message. For example, the receiver identification extraction unit 153 can extract the receiver identification recorded in the reply message to identify the user who sends the message, to which the currently received reply message is a response.

The reply forwarding unit 155 can be used to forward the reply message according to the receiver identification information. For example, the reply forwarding unit 155 can send the reply message to the IM tool corresponding to the receiver identification information to allow the user who has previously sent the message to view the corresponding reply message.

Figure 10:
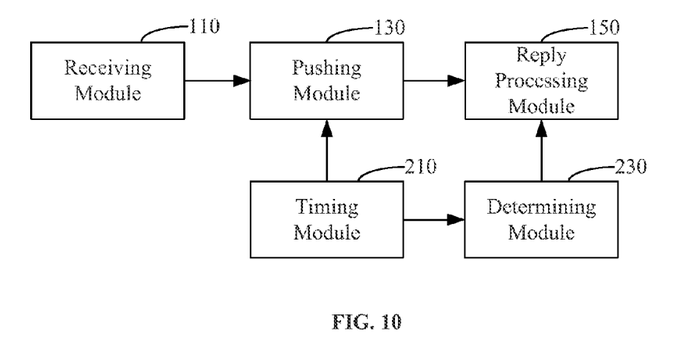
FIG. 10 depicts another exemplary system for handling a message on an IM open platform in accordance with various disclosed embodiments.

FIG. 10 depicts another exemplary system in accordance with various disclosed embodiments. Compared with the exemplary system depicted in FIG. 7, a timing module 210 and/or a determining module 230 can further be included in the system as depicted in FIG. 10.

The timing module 210 can be used to trigger timing via a pushing of the message to obtain a reply waiting time. For example, pushing a message can cause the timing module 210 to trigger timing to time a waiting time for the IM open platform to receive a response to the message from the network application. On the IM open platform, the timing module 210 can perform timing with respect to every pushed message to obtain a corresponding reply waiting time for every message.

The determining module 230 can be used to determine, based on a set time threshold, whether a reply waiting time is timeout. When a reply waiting time is determined to be timeout, the system can refuse to receive a reply message. Otherwise, when the reply waiting time is determined not to be timeout, the reply processing module 150 can be notified.

In one embodiment, when the determining module 230 determines that the currently timed reply waiting time is timeout, that is, the currently timed reply waiting time exceeds the set time threshold, connection with the server resource of the network application can be disconnected to stop receiving a reply message returned from the network application.

The determining module 230 can use the timed reply waiting time and the set time threshold to control the response of the network application to user's message to ensure the instantaneity of the message and to allow the user to obtain the latest message.

Figure 11:
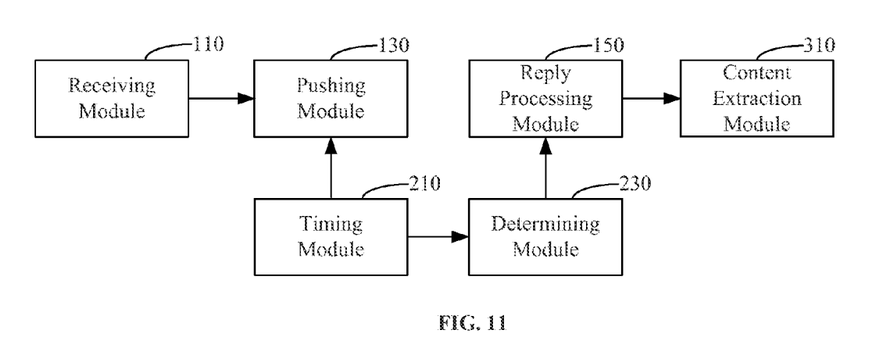
FIG. 11 depicts another exemplary system for handling a message on an IM open platform in accordance with various disclosed embodiments.

FIG. 11 depicts another exemplary system in accordance with various disclosed embodiments. Compared with the exemplary system depicted in FIG. 10, a content extraction module 310 can further be included in the system depicted in FIG. 11.

The content extraction module 310 can be used to extract message content from the received reply message and display the extracted message content. For example, after the IM tool corresponding to the receiver of the reply message receives the reply message forwarded by the IM open platform, the content extraction module 310 can directly extract the message content recorded in the reply message and display the message content in a conversation interface with the network application.

Figure 12:
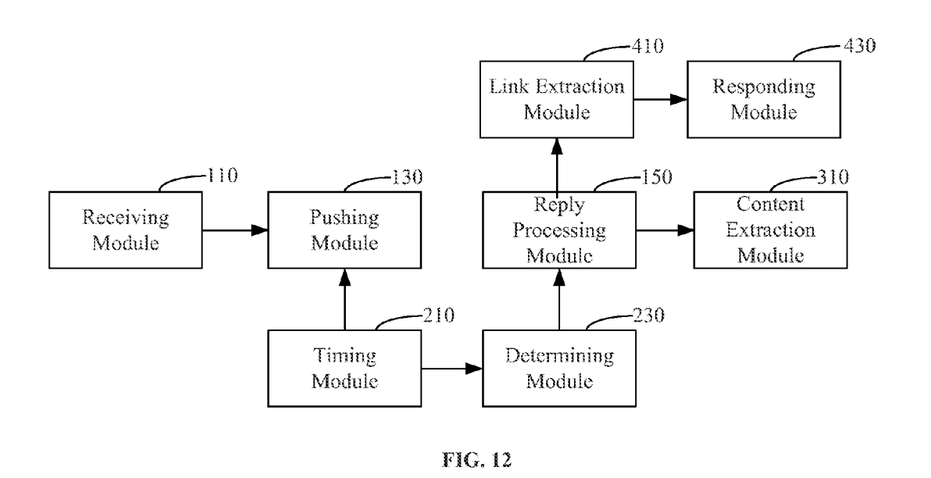
FIG. 12 depicts another exemplary system for handling a message on an IM open platform in accordance with various disclosed embodiments.

FIG. 12 depicts another exemplary system in accordance with various disclosed embodiments. Compared with the exemplary system depicted in FIG. 11, a link extraction module 410 and/or a responding module 430 can further be included in the system depicted in FIG. 12.

The link extraction module 410 can be used to extract a recorded link from the received reply message. The responding module 430 can be configured to use the extracted link to play the media document or to display the image.

For example, the responding module 430 can use the extracted link to download the corresponding media document or image and to display the media document or image in the conversation interface with the network application.

Therefore, in the disclosed methods and systems for handling messages on an IM open platform, after a message sent by the user to the network application is received, the message can be pushed to an access address of the network application. Based on the pushed message, the network application can return a reply message to the IM open platform to have the IM open platform forward the reply message. In this manner, only after the message (e.g., sent by the user) is received can a message generated by the network application circulate via the IM open platform. This can effectively prevent network applications from freely pushing messages, and thus can reduce operation burden of the IM open platform, save network resources, and avoid causing harassment to users.

In various embodiments, the disclosed modules for the exemplary servers as depicted above can be configured in one device or configured in multiple devices as desired. The modules disclosed herein can be integrated in one module or in multiple modules for processing messages. Each of the modules disclosed herein can be divided into one or more sub-modules, which can be recombined in any manners.

Figure 14:
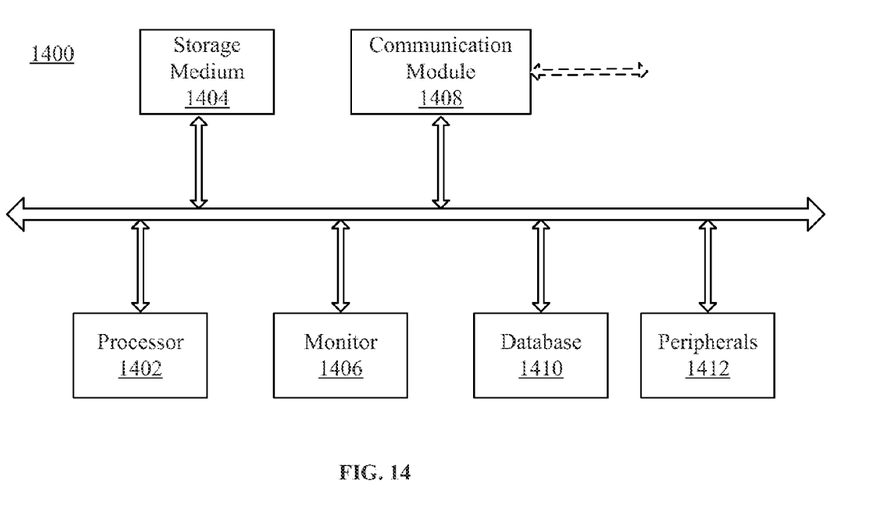
FIG. 14 depicts an exemplary computing system in accordance with various disclosed embodiments.

The disclosed embodiments can be examples only. One of ordinary skill in the art would appreciate that suitable software and/or hardware (e.g., a universal hardware platform) may be included and used to perform the disclosed methods. For example, the disclosed embodiments can be implemented by hardware only, which alternatively can be implemented by software products only. The software products can be stored in a storage medium (e.g., as shown in FIG. 14). The software products can include suitable commands to enable a terminal device (e.g., including a mobile phone, a personal computer, a server, or a network device, etc.) to implement the disclosed embodiments.

Figure 13:
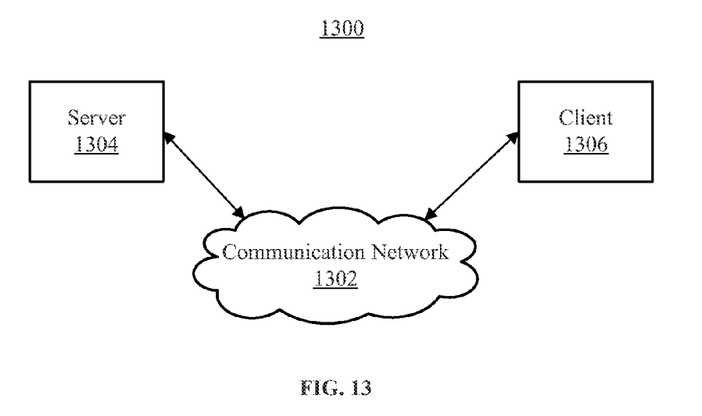
FIG. 13 depicts an exemplary environment incorporating certain disclosed embodiments.

FIG. 13 depicts an exemplary environment 1300 incorporating various disclosed embodiments. As shown in FIG. 13, the environment 1300 may include a server 1304, a client 1306, and/or a communication network 1302. The server 1304 and the client 1306 may be coupled through the communication network 1302 for information exchange, such as message processing, and/or instant messaging communication. Although only one client 1306 and one server 1304 is shown in the environment 1300, any number of clients 1306 or servers 1304 may be included, and other devices may also be included.

Communication network 1302 may include any appropriate type of communication network for providing network connections to the server 1304 and client 1306 or among multiple servers 1304 or clients 1306. For example, communication network 1302 may include the Internet or other types of computer networks or telecommunication networks, either wired or wireless.

The client 1306 may refer to any appropriate user terminal with certain computing capabilities, such as a personal computer (PC), a work station computer, a server computer, a hand-held computing device (tablet), a smart phone, or mobile phone, or any other user-side computing device. In one embodiment, the client 1306 can include the mobile terminal 610 as shown in FIG. 6.

The server 1304 may refer to one or more server computers configured to provide certain server functionalities, such as media file pushing, database management, search engines, etc. The server may also include one or more processors to execute computer programs in parallel. For example, the server 1304 may be a public platform server as disclosed herein. In one embodiment, the server 1304 can include the IM open platform server 630 as shown in FIG. 6.

The server 1304 and/or client 1306 may be implemented on any appropriate computing platform. FIG. 14 shows a block diagram of an exemplary computing system 1430 capable of implementing the server 1304 and/or client 1306.

As shown in FIG. 14, the computing system 1430 may include a processor 1432, a storage medium 1434, a monitor 1436, a communication module 1438, a database 1413, and/or peripherals 1412. Certain devices may be omitted and other devices may be included.

The processor 1432 may include any appropriate processor or processors. Further, processor 1432 can include multiple cores for multi-thread or parallel processing. Storage medium 1434 may include memory modules, such as ROM, RAM, flash memory modules, and erasable and rewritable memory, and mass storages, such as CD-ROM, U-disk, and hard disk, etc. Storage medium 1434 may store computer programs for implementing various processes, when executed by the processor 1432.

Further, the peripherals 1412 may include I/O devices such as keyboard and mouse, and the communication module 1438 may include network devices for establishing connections through the communication network 1302. Database 1413 may include one or more databases for storing certain data and for performing certain operations on the stored data, such as database searching.

Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

Methods and systems for handling a message on an instant messaging (IM) open platform are provided. In an exemplary method, a message sent to a network application can be received. The network application can be an application plugged in the IM open platform. The received message can be pushed to an access address of the network application. A reply message returned by the network application based on the message can be received and forwarded.

An exemplary system for handling a message on an instant messaging (IM) open platform can include a receiving module, a pushing module, and a reply processing module. The receiving module can be configured to receive a message sent to a network application. The network application can be an application plugged in the IM open platform. The pushing module can be configured to push the received message to an access address of the network application. The reply processing module can be configured to receive a reply message returned by the network application based on the message and to forward the reply message.

As disclosed, after a message sent by a user to a network application is received, the message can be pushed to an access address of the network application. Based on the pushed message, the network application can return a reply message to the IM open platform to have the IM open platform forward the reply message. In this manner, only after the message (e.g., sent by the user) is received, a message generated by the network application can circulate via the IM open platform. This can effectively prevent network applications from freely pushing messages, and thus can reduce operation burden of the IM open platform, save network resources, and avoid causing harassment to users.

What is claimed is:

1. A method for handling a message on an instant messaging (IM) open platform and avoiding spam messages, comprising:
   receiving, by a server of the IM open platform, a message sent to a network application from a user terminal, wherein the network application is a third-party application plugged in the IM open platform;
   pushing the received message to an access address of the network application;
   receiving a reply message returned by the network application based on the message; and
   forwarding the reply message to the user terminal;
   wherein, after pushing the received message to the access address of the network application, the method further comprises:
      triggering timing starting from a time that the server of the IM open platform pushes the received message to obtain a timed reply waiting time;
      determining whether the timed reply waiting time is currently timeout based on a set time threshold; and
      refusing to receive the reply message, when the timed reply waiting time is determined to be timeout; or
      receiving and forwarding the reply message returned by the network application based on the message, when the timed reply waiting time is determined not to be timeout.

2. The method of claim 1, wherein pushing the received message comprises:
   extracting identification information of the network application from the received message;
   finding the access address of the network application based on the identification information of the network application; and
   pushing the received message according to the access address.

3. The method of claim 1, wherein receiving and forwarding the reply message comprises:
   receiving the reply message returned by the network application based on the message;
   extracting the receiver identification information from the reply message; and forward the reply message according to the receiver identification information.

4. The method of claim 1, wherein the reply message comprises a text message, and after receiving and forwarding the reply message, the method further comprises:
extracting message content from the received reply message; and
displaying the extracted message content.

5. The method of claim 1, wherein the reply message comprises a media message, an image message, and a combination thereof, and after receiving and forwarding the reply message, the method further comprises:
extracting a recorded link from the received reply message; and
using the extracted link to play the media document or display the image.

6. A system for handling a message on an instant messaging (IM) open platform and avoiding spam messages, comprising:
at least one processor configured to execute:
a receiving module, configured to receive a message sent to a network application from a user terminal, wherein the network application is a third-party application plugged in the IM open platform;
a pushing module, configured to push the received message to an access address of the network application;
a reply processing module, configured to receive and forward a reply message, returned by the network application based on the message, to the user terminal;
a timing module, configured to trigger timing starting from a time that the pushing module pushes the received message to obtain a timed reply waiting time; and
a determining module, configured to determine whether the timed reply waiting time is currently timeout based on a set time threshold, wherein the system refuses to receive the reply message when the reply waiting time is determined to be timeout, and the reply processing module is notified to receive and forward the reply message when the timed reply waiting time is determined not to be timeout.

7. The system of claim 6, wherein the pushing module comprises:
an application identification extraction unit, configured to extract identification information of the network application from the received message;
an address lookup unit, configured to find the access address of the network application based on the identification information of the network application; and
a message pushing unit, configured to push the received message according to the access address.

8. The system of claim 6, wherein the reply processing module comprises:
a reply receiving unit, configured to receive the reply message returned by the network application based on the message;
a receiver identification extraction unit, configured to extract the receiver identification information from the reply message; and
a reply forwarding unit, configured to forward the reply message according to the receiver identification information.

9. The system of claim 6, wherein the reply message comprises a text message, and the at least one processor is further configured to execute:

a content extraction module, configured to extract message content from the received reply message and to display the extracted message content.

10. The system of claim 6, wherein the reply message comprises a media message, an image message, and a combination thereof, and the at least one processor is further configured to execute:
a link extraction module, configured to extract a recorded link from the received reply message; and
a responding module, configured to use the extracted link to play the media document or display the image.

11. A computer-readable medium containing computer-executable program for, when being executed by a computer, performing a method for handling a message on an instant messaging (IM) open platform and avoiding spam messages, the method comprising:
receiving, by a server of the IM open platform, a message sent to a network application from a user terminal, wherein the network application is a third-party application plugged in the IM open platform;
pushing the received message to an access address of the network application;
receiving a reply message returned by the network application based on the message; and
forwarding the reply message to the user terminal;
wherein, after pushing the received message to the access address of the network application, the method further comprises:
triggering timing starting from a time that the server of the IM open platform pushes the received message to obtain a timed reply waiting time;
determining whether the timed reply waiting time is currently timeout based on a set time threshold; and
refusing to receive the reply message, when the timed reply waiting time is determined to be timeout; or
receiving and forwarding the reply message returned by the network application based on the message, when the timed reply waiting time is determined not to be timeout.

12. The computer-readable medium of claim 11, wherein pushing the received message comprises:
extracting identification information of the network application from the received message;
finding the access address of the network application based on the identification information of the network application; and
pushing the received message according to the access address.

13. The computer-readable medium of claim 11, wherein receiving and forwarding the reply message comprises:
receiving the reply message returned by the network application based on the message;
extracting the receiver identification information from the reply message; and
forward the reply message according to the receiver identification information.

14. The computer-readable medium of claim 11, wherein the reply message comprises a text message, and after receiving and forwarding the reply message, the method further comprises:
extracting message content from the received reply message; and
displaying the extracted message content.

15. The computer-readable medium of claim 11, wherein the reply message comprises a media message, an image message, and a combination thereof, and after receiving and forwarding the reply message, the method further comprises:
- extracting a recorded link from the received reply message; and
- using the extracted link to play the media document or display the image.

16. The method of claim 1, wherein:
the network application is displayed as a contact in an IM interface corresponding to the IM open platform on the user terminal.

17. The method of claim 16, wherein:
the message received by the server of the IM open platform is sent from a conversation interface with the network application, after the user terminal selects the contact corresponding to the network application from a contact list, enters the conversation interface, and inputs the message in the conversation interface.

18. The method of claim 1, wherein:
the access address corresponding to a third-party server that maintains the network application; and
the third-party server generates the reply message based on the message sent from the server of the IM open platform.

* * * * *